United States Patent [19]

Sälzle

[11] Patent Number: 5,372,633
[45] Date of Patent: Dec. 13, 1994

[54] METHOD OF REDUCING THE LEAD AND/OR BARIUM EMISSION OF CRYSTAL GLASS OBJECTS CONTAINING LEAD AND/OR BARIUM ON CONTACT WITH A LIQUID PHASE

[76] Inventor: Erich Sälzle, Nadistrasse 59, 8000 München 40, Germany

[21] Appl. No.: 65,265

[22] Filed: May 21, 1993

[30] Foreign Application Priority Data

May 22, 1992 [DE] Germany .............................. 4217057

[51] Int. Cl.$^5$ .............................................. C03C 23/00
[52] U.S. Cl. .......................................... 65/30.1; 65/31
[58] Field of Search ................... 65/30.1, 31, 60.53, 65/60.1, 61; 156/663, DIG. 111, DIG. 88, DIG. 85; 427/307, 309, 444; 252/79.5

[56] References Cited

U.S. PATENT DOCUMENTS

| | | | |
|---|---|---|---|
| 3,290,193 | 12/1966 | Sälzle | 65/31 |
| 3,389,047 | 6/1968 | Lavin | |
| 3,546,037 | 12/1970 | Sälzle | 156/663 |
| 4,332,649 | 6/1982 | Sälzle | 156/663 |
| 4,555,304 | 11/1985 | Sälzle | 156/663 |
| 4,981,733 | 1/1991 | Dumas | 428/34.6 |
| 4,983,199 | 1/1991 | Dumas | 65/60.5 |
| 5,232,753 | 8/1993 | Cornier | 65/30.13 |

FOREIGN PATENT DOCUMENTS 2041964 11/1991 Canada .
106301 4/1984 European Pat. Off. .
458713 11/1991 European Pat. Off. .

*Primary Examiner*—Karen M. Hastings
*Assistant Examiner*—Steven P. Griffin
*Attorney, Agent, or Firm*—Browdy and Neimark

[57] ABSTRACT

A method is described for reducing the lead and/or barium emission of articles of crystal glass containing lead and/or barium, particularly so-called lead crystal and baryte glasses, on contact with a liquid phase, particularly aqueous, aqueous-acidic, alcoholic and aqueous-alcoholic liquids such as acetic acid solutions, wine, whiskey, liqueurs and the like, with the crystal glass objects being treated, if applicable before and/or after acid polishing, with 5 to 45% by weight of an alkali hydroxide solution at a temperature of 20° to 60° C.

26 Claims, No Drawings

METHOD OF REDUCING THE LEAD AND/OR BARIUM EMISSION OF CRYSTAL GLASS OBJECTS CONTAINING LEAD AND/OR BARIUM ON CONTACT WITH A LIQUID PHASE

BACKGROUND OF THE INVENTION

This invention refers to a method of reducing the lead and/or barium emission of articles of crystal glass containing lead and/or barium, particularly so-called lead crystal and baryte glasses, on contact with a liquid phase, particularly aqueous, aqueous-acidic, alcoholic and aqueous-alcoholic liquids such as acetic acid solutions, wine, whiskey, liqueurs and the like.

It is common knowledge to process crystalline glasses containing lead and up to 32% lead crystal glasses, as well as baryte glasses with up to 7% by weight of BaO, uncut, cut or pressed, to form drinking glasses, bowls, vases, etc. The surface is greatly enlarged by the often extensive cutting, and the many edges produce optimal reflection of the impinging light and hence the desired brilliance of the surface.

For some four to five years, following great improvement in analytic technology, drinking glasses and bottles containing lead and barium have been tested for possible lead and/or barium emission in an acidic medium and, for bottles, in an alcoholic medium.

Tests have shown that the emissions are greatest in the first 24 hours and that they then asymptotically approach a saturation value.

The lead emission in an acidic medium is measured with a 4% acetic acid solution at 20° C. as a function of time.

Furthermore, subjecting crystal glasses of the kinds described above to acid polishing is generally known. For instance, this can be done with a mixture of a 20 to 40% hydrofluoric acid and a 15 to 30% sulfuric acid. In addition, in EP-A 0 106 301 a method is known for polishing glass objects in a polish bath containing sulfuric acid and hydrofluoric acid, wherein acids having a dissociation constant greater than that of the hydrofluoric acid are added to control the fluorine ion concentration. With this method a polish with a greatly reduced surface wear-off can be achieved.

A disadvantage of the known crystal glasses is their lead and/or barium emission on contact with liquid phases.

SUMMARY OF THE INVENTION

The object of the present invention is therefore to reduce the lead and/or barium emission of crystal glasses containing lead and/or barium to such an extent that no legal regulations become necessary.

Surprisingly, it has been found that the given problem can be solved by treating the crystal glass objects, particularly placing them in corresponding baths, if applicable before and/or after an acid polishing, with a 5 to 45% by weight solution of alkali hydroxide at a temperature of 20° to 60° C.

DESCRIPTION

In a particularly advantageous embodiment of the invention the treatment with an alkali hydroxide solution in accordance with the invention is combined with an acid polishing, which can be conducted using any of the commonly known methods.

The invention is particularly based on the recognition that in the treatment of crystal glasses of the type described above with aqueous alkali hydroxide solutions, owing to the formation especially of plumbates and corresponding barium compounds, lead and/or barium can be dissolved out of the surface of the glasses to such an extent that the lead and/or barium emission can be reduced at least by factor 10.

This is true in particular whenever this treatment is combined with acid polishing and the treatment takes place as a pretreatment, aftertreatment or as pre- and aftertreatment. The plumbates formed by the alkali ions, for example, are soluble in the aqueous alkali hydroxide solution and impoverish the surface of lead. The unbinded lead oxide is dissolved out of the surface and thus eliminated from a later lead emission.

Tests have shown a heavy dependence of the lead emission on glass composition, lead content, production method and manufacturer, as well as on whether or not, for example, bottles are filled unwashed and unpolished (acid polished) or washed and unpolished. If the bottles were acid polished, the lead emission in general has been halved relative to unpolished bottles, with the differences between unwashed and acid polished and washed and polished then being only marginal.

For bottles (32% PbO) filled with 40% alcohol, with various starting points and after a standing period of one month the following lead emissions were detected:

| | |
|---|---|
| bottle unpolished, unwashed | 0.40 ppm Pb |
| bottle unpolished, washed | 0.50 ppm Pb |
| bottle acid polished, not pretreated | 0.20 ppm Pb |
| bottle acid polished, pretreated | 0.10 ppm Pb |

The acid polished bottles were processed using the method of fluorine ion control by means of tartaric acid according to EP-A 0 106 301, and were pretreated with a 10% caustic soda solution.

Emission measurements of drinking glasses (30% PbO) acid polished according to the conventional method (without fluorine ion control, with acids having a dissociation constant greater than that of the hydrofluoric acid) and, by way of comparison, using the method of fluorine ion control with tartaric acid, show the following lead emissions after treatment with 4% acetic acid and a standing time of 24 hours:

| | |
|---|---|
| drinking glass untreated, washed | 220 ppm Pb |
| drinking glass acid polished, washed, conventional method | 200 ppm Pb |
| drinking glass acid polished, pretreated, washed, fluorine ion controlled method | 100 ppm Pb |

The test results show that the lead emission in lead crystal glasses can be reduced by approximately 10% by acid polishing (conventional method), with the possibility of a further reduction by 50% by using a fluorine ion controlled acid polishing and alkaline pretreatment. The pretreatment was carried out with a 10% caustic soda solution at 40° C.

As the length of time spent in the alkali solution during pre- and/or aftertreatment increases, the lead emission is reduced almost linearly. The lead emission is also reduced almost linearly by raising the temperature of the treatment baths. The economical limit is reached at approximately 60° C. The lead emission likewise decreases linearly as the concentration of the alkali hydroxides in the treatment baths increases.

A potassium hydroxide solution is preferably used as the alkali hydroxide solution, since the use of a potassium hydroxide solution can effect a reduction of the lead emission, for instance, by 10% relative to a sodium hydroxide solution. A sodium hydroxide or sodium-potassium hydroxide solution can instead be used.

If the method according to the invention is combined with an acid polishing, particularly advantageous results are obtained when the acid polishing takes place in accordance with the method known in EP-A 0 106 301.

Since the polishing to be achieved with this method is attained by a greatly reduced surface wear-off, the necessary reduction of the lead and barium emission from the surface of crystal glasses can be achieved in combination with a pretreatment or a pre- and aftertreatment, as well as solely with an aftertreatment (if conventional acid polishing is used) with the alkali hydroxide solutions described above. By moving the glasses in the treatment baths the required time spent in the baths, or if the time remains the same, the lead and barium emission can be reduced. If a conventional acid polishing with a comparatively heavy wear-off is used, it is preferable to refrain from conducting an alkali hydroxide pretreatment.

Crystal glasses with 0.3 to 1.0% by weight of boron oxide, 0.2 to 0.5% by weight of lithium oxide and 0.2 to 0.5% by weight of zinc oxide is particularly suitable for carrying out the method according to the invention.

Since the pre- and aftertreatment baths become enriched with alkali plumbates and/or alkaline-earth plumbates, the dissolved plumbate is precipitated to maintain the solubility, preferably after having been correspondingly enriched by the introduction of carbon dioxide or the addition of carbonates.

With glasses containing baryte the pre- and aftertreatment preferably takes place at 30° to 60° C. with a 20 to 40% aqueous sodium or potassium hydroxide solution. The pretreatment preferably lasts for 5 to 20 minutes, and the duration of the aftertreatment is preferably between 10 and 20 minutes. The barium concentration in 4% acetic acid after a standing time of 24 hours at 25° C. was measured at 25 ppb.

According to a particularly preferred embodiment of the invention, the glass objects are treated with an alkali hydroxide solution for at least 10 but preferably 10 to 25 minutes prior to the acid polishing, and after the acid polishing for at least 10 but preferably 10 to 40 minutes.

According to another preferred embodiment of the invention the acid polishing is carried out with a mixture of a 20 to 40% hydrofluoric acid and a 15 to 30% sulfuric acid, and the glass objects are treated with the alkali hydroxide solution for 10 to 40 minutes after the acid polishing.

According to a further preferred embodiment of the invention, the acid polishing takes place with a mixture of a 0.5 to 10% hydrofluoric acid and a 40 to 75% sulfuric acid, and the glass objects are treated with an alkali hydroxide solution for 10 to 40 minutes before the acid polishing and for 10 to 40 minutes after the acid polishing.

If, during the acid polishing, the fluorine ion concentration is controlled by a third acid with a dissociation constant greater than that of the hydrofluoric acid, this third acid preferably consists of tartaric, oxalic, malonic, citric, acetic, phosphoric, fluorosilicic acid or mixtures thereof. The third acid is preferably used in a concentration of 0.5 to 14 g per liter of treatment acid, depending on the composition of the glass objects.

The following examples should explain the method of the invention in more detail.

The tests were conducted with conventional lead crystal glasses with a lead content of 24 to 32%, which exhibit the highest lead emission.

EXAMPLE 1

Commercially common drinking glasses with a PbO content of 30 or 24% were acid polished in accordance with the method known in EP-A 0 106 301 and subjected to the pre- and aftertreatments shown in the following table. Subsequently, the lead emission in ppm in 4% acetic acid after 24 hours was determined.

TABLE 1

| Drinking glasses (30% PbO) experiment no. | Pre-treatment 30% NAOH 40° C. | After-treatment 30% NAOH 40° C. | Lead emission ppm in 4% acetic acid |
|---|---|---|---|
| 1) acid polished | none | none | 1.6 |
| 2) acid polished | 3 min. | 3 min. | 1.3 |
| 3) acid polished | 5 min. | 5 min. | 1.2 |
| 4) acid polished | 20 min. | 20 min. | 0.75 |
| Drinking glasses (24% PbO) | | | |
| 5) acid polished | 20 min. | 20 min. | 0.04 |

The examples clearly reveal the linear dependence of the lead emission on the reaction time in the pre- and aftertreatment with alkaline solutions.

EXAMPLE 2

Further commercially common drinking glasses with a PbO content of 30 or 24% were pre- and aftertreated with sodium or potassium hydroxide solutions before and after the acid polishing, to determine the influence of the alkalis used.

The results compiled in the following Table 2 were obtained.

TABLE 2

| Drinking glasses (30% PbO) experiment no. | Pre-treatment 40% NAOH 50° C. 30 min. | After-treatment 40% NAOH 50° C. 30 min. | Lead emission acetic acid 4% 24 h ppm | Pre-treatment 40% KOH 50° C. 30 min. | After-treatment 40% KOH 50° C. 30 min. | Lead emission acetic acid 4% 24 h ppm |
|---|---|---|---|---|---|---|
| 6) acid pol. | none | none | 1.5 | | | |
| 7) acid pol. | yes | yes | 0.4 water 24 h | yes | yes | 0.3 water 24 h |
| 8) acid pol. | yes | yes | 0.2 | yes | yes | 0.2 |
| Drinking glasses (24% PbO) | | | acetic acid 4% | | | |
| 9) acid pol. | yes | yes | 0.03 | yes | yes | 0.2 |

Experiments 6 and 7 demonstrate the advantageous influence of a pre- and aftertreatment with sodium and potassium hydroxide solutions. Experiment 7 shows the more favorable effect of potassium hydroxide solutions over sodium hydroxide solutions. A comparison of the results of experiments 7 and 9 demonstrates the influence of the glass composition.

What is claimed is:

1. A method of reducing lead and/or barium emission of crystal glass objects, containing lead and/or barium, upon contact of said crystal glass objects with a liquid phase, comprising treating said crystal glass objects with a 5 to 45% by weight alkali hydroxide solution having a temperature of 20° to 60° C.

2. A method according to claim 1, wherein said alkali hydroxide solution is a sodium, potassium or sodium-potassium hydroxide solution.

3. A method according to claim 2, wherein said glass objects are introduced into said alkali hydroxide solution and are moved therein to abbreviate reaction time.

4. A method according to claim 1, wherein said glass objects are introduced into said alkali hydroxide solution and are moved therein to abbreviate reaction time.

5. A method according to claim 1, wherein the treatment with an alkali hydroxide solution lasts for at least 10 minutes.

6. A method according to claim 1, further comprising introducing carbon dioxide into said alkali hydroxide solution and/or adding carbonates, whereby plumbates dissolved therein are precipitated as lead carbonates and said lead carbonates are separated.

7. A method according to claim 1, wherein said glass objects further contain 0.3 to 1.0% by weight of boron oxide, 0.2 to 0.5% by weight of lithium oxide, and 0.2 to 0.5% by weight of zinc oxide.

8. A method according to claim 1 wherein said treatment with an alkali hydroxide solution lasts for at least 20 minutes.

9. A method according to claim 1, wherein said crystal glass objects are additionally acid polished before and/or after said treating with said alkali hydroxide solution.

10. A method according to claim 1, wherein said glass objects are treated with said alkali hydroxide solution for at least 10 minutes, prior to said acid polishing, and for at least 10 minutes after said acid polishing.

11. A method according to claim 10 wherein said treatment prior to said acid polishing is for 10–25 minutes, and said treatment after said acid polishing is for 10–40 minutes.

12. A method according to claim 9, wherein said acid polishing takes place with a treatment acid of a mixture of a 20 to 40% by weight hydrofluoric acid and a 15 to 30% by weight sulfuric acid and that said glass objects are treated with said alkali hydroxide solution for 10 to 40 minutes after said acid polishing.

13. A method according to claim 12, wherein fluorine ion concentration in said acid polishing is controlled by an additional acid having a dissociation constant greater than that of said hydrofluoric acid.

14. A method according to claim 13, wherein said additional acid is selected from the group consisting of tartaric, oxalic, malonic, citric, acetic, phosphoric, fluorosilicic acid and mixtures thereof.

15. A method according to claim 13, wherein said additional acid is used in a concentration of 0.5 to 14 g per liter of said treatment acid, depending on the composition of said glass objects.

16. A method according to claim 9, wherein said acid polishing takes place with a treatment acid of a mixture of a 0.5 to 10% by weight hydrofluoric acid and a 40 to 75% by weight sulfuric acid and said glass objects are treated with said alkali hydroxide solution for 10 to 40 minutes prior to said acid polishing and for 10 to 40 minutes after said acid polishing.

17. A method according to claim 16, wherein fluorine ion concentration in said acid polishing is controlled by an additional acid having a dissociation constant greater than that of said hydrofluoric acid.

18. A method according to claim 17, wherein said additional acid is selected from the group consisting of tartaric, oxalic, malonic, citric, acetic, phosphoric, fluorosilicic acid and mixtures thereof.

19. A method according to claim 18, wherein said additional acid is used in a concentration of 0.5 to 14 g per liter of said treatment acid, depending on the composition of said glass objects.

20. A method according to claim 9, wherein said alkali hydroxide solution is a sodium, potassium or sodium-potassium hydroxide solution.

21. A method according to claim 20, wherein said glass objects are introduced into said alkali hydroxide solution and are moved therein to abbreviate reaction time.

22. A method according to claim 9, wherein said glass objects are introduced into said alkali hydroxide solution and are moved therein to abbreviate reaction time.

23. A method according to claim 9, wherein the treatment with an alkali hydroxide solution lasts for at least 10 minutes.

24. A method according to claim 9, further comprising introducing carbon dioxide into said alkali hydroxide solution and/or adding carbonates, whereby plumbates dissolved therein are precipitated as lead carbonates and said lead carbonates are separated.

25. A method according to claim 9, wherein said glass objects further contain 0.3 to 1.0% by weight of boron oxide, 0.2 to 0.5% by weight of lithium oxide, and 0.2to 0.5% by weight of zinc oxide.

26. A method according to claim 9 wherein said treatment with an alkali hydroxide solution lasts for at least 20 minutes.

* * * * *